US011102757B2

(12) United States Patent
Tang et al.

(10) Patent No.: US 11,102,757 B2
(45) Date of Patent: Aug. 24, 2021

(54) RESOURCE MAPPING METHOD AND USER EQUIPMENT

(71) Applicant: Huawei Technologies Co., Ltd., Shenzhen (CN)

(72) Inventors: Hao Tang, Shanghai (CN); Guohua Zhou, Shanghai (CN); Zhenfei Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 47 days.

(21) Appl. No.: 16/444,497

(22) Filed: Jun. 18, 2019

(65) Prior Publication Data

US 2019/0306833 A1 Oct. 3, 2019

Related U.S. Application Data

(63) Continuation of application No. PCT/CN2018/071290, filed on Jan. 4, 2018.

(30) Foreign Application Priority Data

Jan. 5, 2017 (CN) .......................... 201710008209.6

(51) Int. Cl.
*H04W 72/00* (2009.01)
*H04L 5/00* (2006.01)
(Continued)

(52) U.S. Cl.
CPC ............. *H04W 72/005* (2013.01); *H04L 5/00* (2013.01); *H04L 5/0039* (2013.01);
(Continued)

(58) Field of Classification Search
None
See application file for complete search history.

(56) References Cited

U.S. PATENT DOCUMENTS

2010/0008317 A1* 1/2010 Bhattad ................. H04L 1/0003
370/329
2011/0103251 A1* 5/2011 Ma ...................... H04W 72/005
370/252
(Continued)

FOREIGN PATENT DOCUMENTS

CN 103517439 A 1/2014
CN 104768160 A 7/2015
(Continued)

OTHER PUBLICATIONS

Samsung, "5G Radio Protocol Architecture," 3GPP TSG-RAN WG2 Meeting #93bis, R2-162207, Dubrovnik, Croatia, Apr. 11-15, 2016, 9 pages.
(Continued)

*Primary Examiner* — Andrew C Oh
(74) *Attorney, Agent, or Firm* — Slater Matsil, LLP

(57) ABSTRACT

This application discloses a resource mapping method and an apparatus. The method includes the following steps: receiving, by user equipment, a first resource message sent by a base station, where the first resource message includes a transmission time unit and an offset value corresponding to the transmission time unit; and determining, by the user equipment, a time-frequency resource location of a physical channel or a physical signal in the transmission time unit based on the transmission time unit and the offset value. The technical solutions provided in this application have an advantage of avoiding interference between two carriers.

30 Claims, 15 Drawing Sheets

(51) Int. Cl.
*H04W 72/04* (2009.01)
*H04W 84/04* (2009.01)

(52) U.S. Cl.
CPC ......... *H04W 72/04* (2013.01); *H04W 72/044* (2013.01); *H04W 84/042* (2013.01)

(56) References Cited

U.S. PATENT DOCUMENTS

| | | | | |
|---|---|---|---|---|
| 2011/0243021 | A1* | 10/2011 | Ponnuswamy | H04L 41/22 370/252 |
| 2012/0044910 | A1* | 2/2012 | Maeda | H04L 5/001 370/332 |
| 2013/0235743 | A1* | 9/2013 | Goldhamer | H04W 72/0453 370/252 |
| 2014/0016491 | A1* | 1/2014 | Gholmieh | H04L 5/00 370/252 |
| 2014/0064135 | A1* | 3/2014 | Chen | H04L 1/0046 370/253 |
| 2014/0211733 | A1* | 7/2014 | Sagae | H04W 72/0453 370/329 |
| 2014/0307685 | A1 | 10/2014 | Takano | |
| 2014/0369293 | A1* | 12/2014 | Guo | H04L 5/0073 370/329 |
| 2015/0016239 | A1* | 1/2015 | Yi | H04L 5/0048 370/201 |
| 2015/0029886 | A1* | 1/2015 | Seo | H04L 5/001 370/252 |
| 2015/0208372 | A1* | 7/2015 | You | H04J 11/0069 370/350 |
| 2015/0333853 | A1 | 11/2015 | Sawai et al. | |
| 2016/0072614 | A1* | 3/2016 | Blankenship | H04L 5/0076 370/329 |
| 2016/0081061 | A1* | 3/2016 | Hu | H04W 4/90 370/312 |
| 2016/0242062 | A1* | 8/2016 | Takeda | H04L 5/0048 |
| 2016/0308636 | A1* | 10/2016 | Deng | H04W 72/0453 |
| 2016/0352551 | A1* | 12/2016 | Zhang | H04L 27/26025 |
| 2017/0026159 | A1* | 1/2017 | Kim | H04L 5/0057 |
| 2017/0085326 | A1* | 3/2017 | Li | H04B 17/345 |
| 2017/0257774 | A1* | 9/2017 | Ghosh | H04L 5/0048 |
| 2017/0289960 | A1* | 10/2017 | Moustafa | H04J 11/0069 |
| 2018/0020418 | A1* | 1/2018 | Chandramouli | H04W 16/14 |
| 2018/0041262 | A1* | 2/2018 | Kang | H04B 7/063 |
| 2018/0077703 | A1* | 3/2018 | Sun | H04L 5/0064 |
| 2018/0097676 | A1* | 4/2018 | Kazmi | H04L 27/2647 |
| 2018/0206253 | A1* | 7/2018 | Yun | H04L 5/0062 |
| 2018/0241457 | A1* | 8/2018 | Lee | H04B 7/06 |
| 2018/0270031 | A1* | 9/2018 | Xia | H04W 72/044 |
| 2019/0013881 | A1* | 1/2019 | Olesen | H04W 16/14 |
| 2019/0013985 | A1* | 1/2019 | Takeda | H04W 56/0015 |
| 2019/0274097 | A1* | 9/2019 | Hietalahti | H04W 52/0212 |
| 2020/0266956 | A1* | 8/2020 | Chen | H04L 5/005 |
| 2020/0305158 | A1* | 9/2020 | Shim | H04L 5/0094 |

FOREIGN PATENT DOCUMENTS

| | | |
|---|---|---|
| CN | 106802155 A | 6/2017 |
| JP | 2013085086 A | 5/2013 |
| JP | 2013521740 A | 6/2013 |
| JP | 2015185930 A | 10/2015 |
| WO | 2010087172 A1 | 8/2010 |
| WO | 2011118993 A2 | 9/2011 |
| WO | 2011126024 A1 | 10/2011 |
| WO | 2014129035 A1 | 8/2014 |
| WO | 2016090411 A1 | 6/2016 |
| WO | 2016186699 A1 | 11/2016 |

OTHER PUBLICATIONS

Huawei, et al., "Discussion on more orthogonal DMRS ports with partial overlapping," 3GPP TSG RAN WG1 Meeting #85, R1-164099, Nanjing, China, May 23-27, 2016, 4 pages.
3rd Generation Partnership Project; Technical Specification Group Radio Access Network; Study on New Radio (NR) Access Technology; Physical Layer Aspects (Release 14), 3GPP TR 38.802 V1.0.0, Nov. 2016, 64 pages.
Huawei, et al., "WF on LTE-NR Coexistence," 3GPP TSG RAN WG1 #87, R1-1613263, Reno, USA, Nov. 14-18, 2016, Agenda item: 7.1.7, 11 pages.
Huawei, et al., "Coexistence between NR and LTE," 3GPP TSG RAN WG1 Meeting #87, R1-1611681, Reno, USA, Nov. 14-18, 2016, Agenda Item:7.1.7, 6 pages.

* cited by examiner

RESOURCE MAPPING METHOD AND USER EQUIPMENT

CROSS-REFERENCE TO RELATED APPLICATIONS

This application is a continuation of International Application No. PCT/CN2018/071290, filed on Jan. 4, 2018, which claims priority to Chinese Patent Application No. 201710008209.6, filed on Jan. 5, 2017. The disclosures of the aforementioned applications are hereby incorporated herein by reference in their entireties.

TECHNICAL FIELD

This application relates to the communications field, and in particular, to a resource mapping method and user equipment.

BACKGROUND

In a deployment process of a wireless communications system, carriers are usually deployed through frequency division multiplexing (FDM), and there is a guard period between the carriers. This rule is commonly applicable to deployment of carriers of same radio access technologies or carriers of different radio access technologies. In an existing deployment method, a width of a carrier is required to match a width of an available spectrum, and the width of the carrier is usually fixed, for example, 5 MHz, 1.4 MHz, or 3 MHz. Such an irregular width is prone to cause a waste in frequency domain resource deployment.

To avoid a waste in frequency domain resource deployment, frequency domain locations of two carriers are allowed to overlap, so that the two carriers can share a resource in an overlapping spectrum. In this solution, although a waste of frequency domain resources can be avoided, the two carriers may interfere with each other on the shared frequency domain resource, and consequently the two carriers cannot normally work.

SUMMARY

This application provides a resource mapping method, to prevent two carriers from interfering with each other, thereby improving system stability.

According to a first aspect, a resource mapping method is provided. The method includes the following steps: receiving, by user equipment, a first resource message sent by a base station, where the first resource message includes a transmission time unit and an offset value corresponding to the transmission time unit; and determining, by the user equipment, a time-frequency resource location of a physical channel or a physical signal in the transmission time unit based on the transmission time unit and the offset value.

After receiving the first resource message, the user equipment in the technical solution provided in the first aspect obtains the transmission time unit and the corresponding offset value based on the first resource message, and determines the time-frequency resource location in the transmission time unit based on the transmission time unit and the offset value. The setting can avoid time-frequency resource interference between two carriers.

In an optional solution, the offset value is $X_1$, and $X_1$ is an integer greater than 0; and the determining, by the user equipment, a time-frequency resource location of a physical channel or a physical signal in the transmission time unit based on the transmission time unit and the offset value includes: determining, by the user equipment, that the time-frequency resource location of the physical channel or the physical signal in the transmission time unit is an $(X_1+1)^{th}$ symbol and a symbol following the $(X_1+1)^{th}$ symbol.

In an optional solution, different symbols are selected for time-frequency resource mapping, so that time-frequency resource interference between two carriers is avoided.

In another optional solution, the method further includes: the transmission time unit is a transmission time unit n, the offset value is $X_2$, and $X_2$ is an integer greater than 0; the receiving, by user equipment, a first resource message sent by a base station is: receiving, by the user equipment, the first resource message in a transmission time unit n-k, where n is a sequence number of the transmission time unit, and k is an integer greater than 0; and the determining, by the user equipment, a time-frequency resource location of a physical channel or a physical signal in the transmission time unit based on the transmission time unit and the offset value is: determining, by the user equipment, that the time-frequency resource location of the physical channel or the physical signal in the transmission time unit n is an $(X_2+1)^{th}$ symbol and a symbol following the $(X_2+1)^{th}$ symbol.

In another optional solution, the first resource message is received in the transmission time unit n-k, so that in a case of entire overlapping, the user equipment can obtain the first resource message and then determine the time-frequency resource location of the physical channel or the physical signal based on the first resource message.

In another optional solution, k=1.

In another optional solution, the method further includes: receiving, by the user equipment, a second resource message sent by the base station, wherein the second resource message includes a first frequency domain resource and a second frequency domain resource, the first frequency domain resource is a frequency domain location of data transmission of the user equipment, the second frequency domain resource includes frequency domain bandwidth information and frequency domain location information of a subcarrier, and the first frequency domain resource does not entirely overlap the second frequency domain resource.

In another optional solution, the frequency domain location information of the subcarrier is a frequency domain offset Y between the subcarrier and a preconfigured reference subcarrier.

In another optional solution, the offset value is $X_3$, and $X_3$ is an integer greater than 0; and the determining, by the user equipment, a time-frequency resource location of a physical channel or a physical signal in the transmission time unit based on the transmission time unit and the offset value includes: determining, by the user equipment, that the time-frequency resource location of the physical signal or the physical channel in the transmission time unit is a first symbol and a symbol following the first symbol, where no resource is mapped to a third frequency domain resource in first $X_3$ symbols of the transmission time unit, and the third frequency domain resource is an overlapping frequency location of the first frequency domain resource and the second frequency domain resource.

In another optional solution, no resource is mapped to the third frequency domain resource in the first $X_3$ symbols of the transmission time unit, and there is a blank in frequency domain resource between the two carriers, so that interference between the two carriers is avoided.

In another optional solution, the transmission time unit is a transmission time unit m, the offset value is $X_4$, and $X_4$ is an integer greater than 0; the user equipment receives the first resource message in a transmission time unit m-k, where m is a sequence number of the transmission time unit, and k is an integer greater than or equal to 0; and the determining, by the user equipment, a time-frequency resource location of a physical channel or a physical signal in the transmission time unit based on the transmission time unit and the offset value includes: determining, by the user equipment, that the time-frequency resource location of the physical signal or the physical channel in the transmission time unit m is the first symbol and a symbol following the first symbol, where no resource is mapped to a third frequency domain resource in first $X_4$ symbols of the transmission time unit m, and the third frequency domain resource is an overlapping frequency location of the first frequency domain resource and the second frequency domain resource.

In another optional solution, the first frequency domain resource is a next technology NR carrier, and the second frequency domain resource is a Long Term Evolution LTE carrier.

According to a second aspect, a resource configuration method is provided. The method includes the following steps: sending, by a base station, a first resource message to user equipment, where the first resource message includes a transmission time unit and an offset value corresponding to the transmission time unit, where the transmission time unit and the offset value are used to determine a time-frequency resource location of a physical channel or a physical signal in the transmission time unit; and sending, by the base station, data to the user equipment on the time-frequency resource location in the transmission time unit.

The technical solution of the second aspect supports implementation of the technical solution of the first aspect.

In an optional solution, the offset value is $X_1$, and $X_1$ is an integer greater than 0; and that the transmission time unit and $X_1$ are used to determine the time-frequency resource location of the physical channel or the physical signal in the transmission time unit includes: determining, by the base station, that the time-frequency resource location of the physical channel or the physical signal in the transmission time unit is an $(X_1+1)^{th}$ symbol and a symbol following the $(X_1+1)^{th}$ symbol.

In an optional solution, different symbols are selected for time-frequency resource mapping, so that time-frequency resource interference between two carriers is avoided.

In another optional solution, the transmission time unit is a transmission time unit n, the offset value is $X_2$, $X_2$ is an integer greater than 0, and the sending, by a base station, a first resource message to user equipment includes: sending, by the base station, the first resource message in a transmission time unit n-k, where n is a sequence number of the transmission time unit, and k is an integer greater than 0, where the transmission time unit n and $X_2$ are used to determine that the time-frequency resource location of the physical channel or the physical signal in the transmission time unit n is an $(X_2+1)^{th}$ symbol and a symbol following the $(X_2+1)^{th}$ symbol.

In another optional solution, the first resource message is received in the transmission time unit n-k, so that in a case of entire overlapping, the user equipment can obtain the first resource message and then determine the time-frequency resource location of the physical channel or the physical signal based on the first resource message.

In an optional solution, k=1.

In an optional solution, after the sending a first resource message, the method further includes: sending, by the base station, a second resource message to the user equipment, where the second resource message includes a first frequency domain resource and a second frequency domain resource, the first frequency domain resource is a frequency domain location of data transmission of the user equipment, the second frequency domain resource includes frequency domain bandwidth information and frequency domain location information of a subcarrier, and the first frequency domain resource does not entirely overlap the second frequency domain resource.

In an optional solution, the frequency domain location information of the subcarrier is a frequency domain offset Y between the subcarrier and a preconfigured reference subcarrier.

In an optional solution, the offset value is $X_3$, and $X_3$ is an integer greater than 0; and the transmission time unit and $X_3$ are used to determine that the time-frequency resource location of the physical signal or the physical channel in the transmission time unit is a first symbol and a symbol following the first symbol, no resource is mapped to a third frequency domain resource in first $X_3$ symbols of the transmission time unit, and the third frequency domain resource is an overlapping frequency location of the first frequency domain resource and the second frequency domain resource.

In an optional solution, the transmission time unit is a transmission time unit m, the offset value is $X_4$, and $X_4$ is an integer greater than 0; the sending, by a base station, a first resource message to user equipment includes: sending, by the base station, the first resource message in a transmission time unit m-k, where m is a sequence number of the transmission time unit, and k is an integer greater than 0; and the transmission time unit m and $X_4$ are used to determine that the time-frequency resource location of the physical signal or the physical channel in the transmission time unit m is the first symbol and a symbol following the first symbol, no resource is mapped to a third frequency domain resource in first $X_4$ symbols of the transmission time unit m, and the third frequency domain resource is an overlapping frequency location of the first frequency domain resource and the second frequency domain resource.

In an optional solution, the offset value is $X_5$, and $X_5$ is an integer greater than 0; and the transmission time unit and $X_5$ are used to determine that the time-frequency resource location of the physical signal or the physical channel in the transmission time unit is the first symbol and a symbol following the first symbol, no resource is mapped to a third frequency domain resource in last $X_5$ symbols of the transmission time unit, and the third frequency domain resource is an overlapping frequency location of the first frequency domain resource and the second frequency domain resource.

In an optional solution, the first frequency domain resource is a next-generation communications technology NR carrier, and the second frequency domain resource is a Long Term Evolution LTE carrier.

According to a third aspect, user equipment is provided, where the user equipment includes: a receiving unit, configured to receive a first resource message sent by a base station, where the first resource message includes a transmission time unit and an offset value corresponding to the transmission time unit; and a processing unit, configured to determine a time-frequency resource location of a physical channel or a physical signal in the transmission time unit based on the transmission time unit and the offset value.

After receiving the first resource message, the user equipment provided in the third aspect obtains the transmission time unit and the corresponding offset value based on the first resource message, and determines the time-frequency resource location in the transmission time unit based on the transmission time unit and the offset value. The setting can avoid time-frequency resource interference between two carriers.

The user equipment provided in the third aspect may be further configured to perform the foregoing optional technical solutions.

According to a fourth aspect, a base station is provided, where the base station includes: a sending unit, configured to send a first resource message to user equipment, where the first resource message includes a transmission time unit and an offset value corresponding to the transmission time unit, and the transmission time unit and the offset value are used to determine a time-frequency resource location of a physical channel or a physical signal in the transmission time unit; and a processing unit, configured to, on the time-frequency resource location in the transmission time unit, control the sending unit to send data to the user equipment.

The base station provided in the fourth aspect supports implementation of the user equipment provided in the third aspect.

The base station provided in the fourth aspect may be further configured to perform the foregoing optional technical solutions.

According to a fifth aspect, user equipment is provided, where the user equipment includes a processor, a wireless transceiver, a memory, and a bus, the wireless transceiver is configured to receive data from an external device and send data to the external device, the processor, the memory, and the transceiver may be connected by using the bus, the memory stores program code, and the processor is configured to invoke the program code stored in the memory to perform or control the wireless transceiver to perform the first aspect or the optional solutions of the first aspect.

According to a sixth aspect, a base station is provided, where the base station includes a processor, a wireless transceiver, a memory, and a bus, the wireless transceiver is configured to receive data from an external device and send data to the external device, the processor, the memory, and the transceiver may be connected by using the bus, the memory stores program code, and the processor is configured to invoke the program code stored in the memory to perform or control the wireless transceiver to perform the second aspect or the optional solutions of the second aspect.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF ILLUSTRATIVE EMBODIMENTS

Figure 1A:
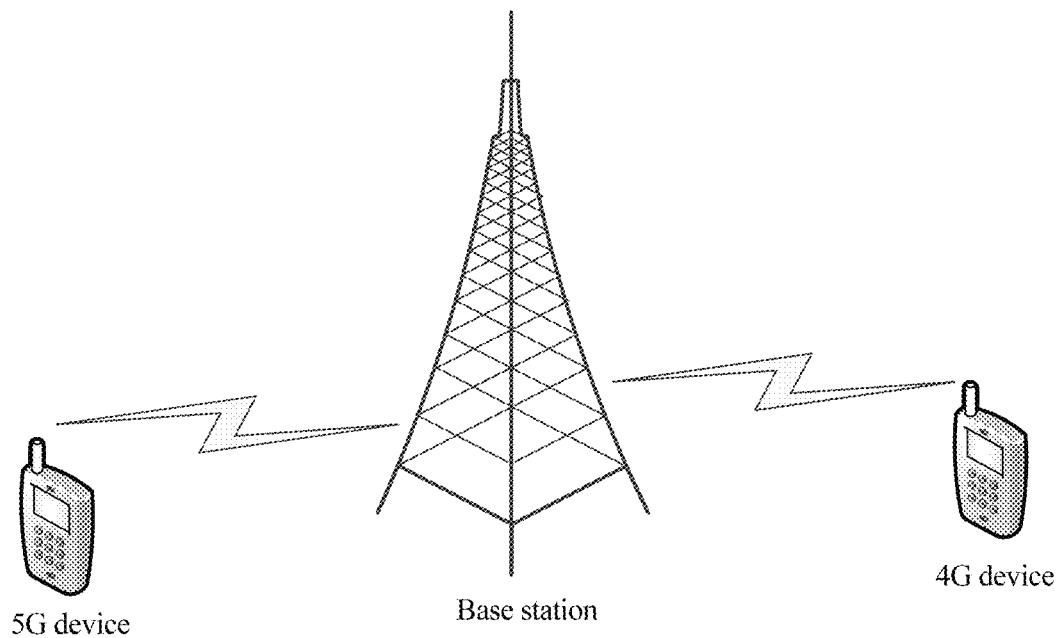
FIG. 1A is a schematic diagram of a system architecture according to this application.
Figure 1B:
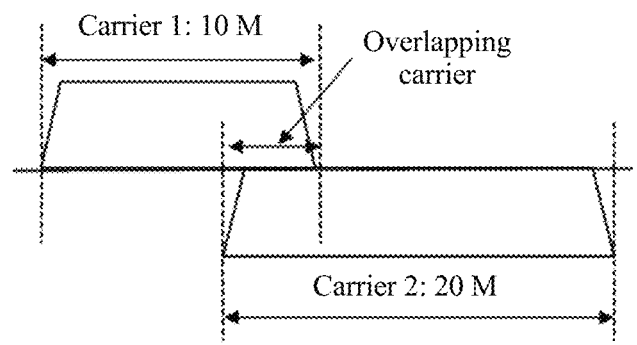
FIG. 1B is a schematic diagram in which a carrier 1 and a carrier 2 partially overlap.
Figure 1C:
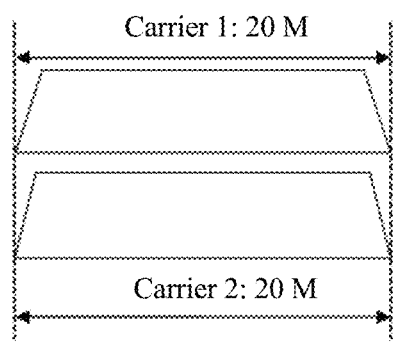
FIG. 1C is a schematic diagram in which a carrier 1 and a carrier 2 entirely overlap.
Figure 1D:
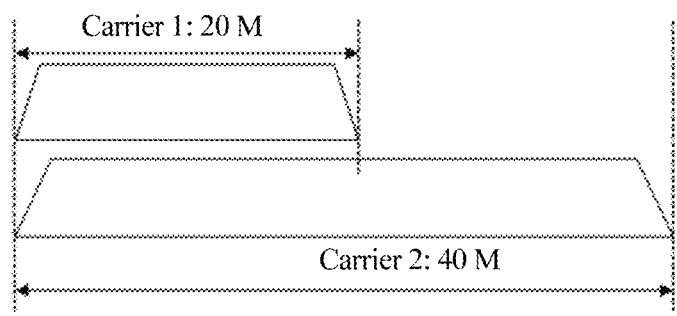
FIG. 1D is a schematic diagram in which a carrier 1 and a carrier 2 excessively overlap.

FIG. 1A is a diagram of a system architecture according to this application. The system architecture includes a base station and user equipment. The user equipment and the base station communicate wirelessly. The base station and the user equipment may communicate by using a carrier 1. Certainly, in actual application, the base station and the user equipment may communicate by using a carrier 2. The carrier 1 may be a Long Term Evolution (English: Long Term Evolution, LTE) carrier, and the carrier 2 may be a next-generation communications technology (New Radio, NR) carrier, or a carrier in a fifth generation 5G communications technology. The user equipment may be a 4G device (for example, an LTE device) and a 5G device (for example, NR user equipment). FIG. 1B, FIG. 1C, and FIG. 1D are schematic diagrams of two carriers in an overlapping spectrum. FIG. 1B is a schematic diagram of partial overlapping. FIG. 1C is a schematic diagram of entire overlapping. FIG. 1D is a schematic diagram of excessive overlapping.

Figure 2:
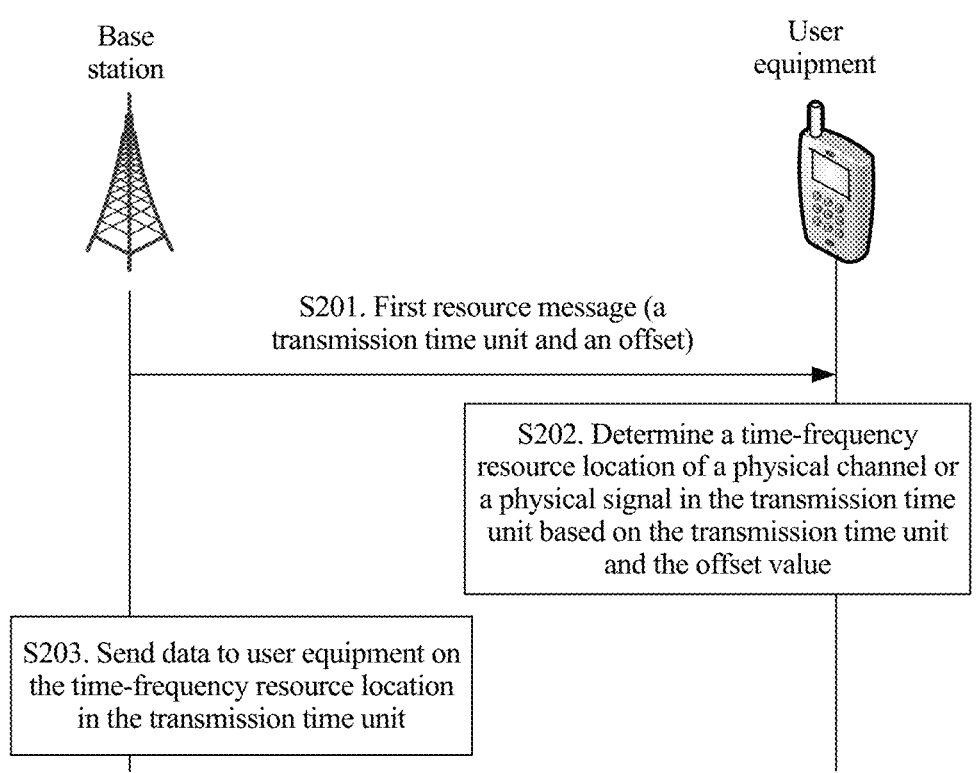
FIG. 2 is a flowchart of a resource mapping method according to an embodiment of this application.

FIG. 2 shows a resource mapping method according to an embodiment of this application. This embodiment is applied to the system architecture shown in FIG. 1A. As shown in FIG. 2, the method includes the following steps.

Step S201: A base station sends a first resource message to user equipment, where the first resource message may include a transmission time unit and an offset value corresponding to the transmission time unit.

The transmission time unit in step S201 may be a basic unit in transmission. This may be understood as follows: Time is divided into a plurality of units, for example, a slot (slot), a mini-slot, or a subframe, and the slot may be the first slot of a Multimedia Broadcast multicast service Single Frequency Network (MBSFN) subframe. The offset value may be a quantity of symbols included in a non-MBSFN region (non-MBSFN region), namely, an offset value $X_1$ of the slot. Alternatively, the transmission time unit may be an MBSFN subframe or a normal (Normal) subframe.

The first resource message may include one transmission time unit or a plurality of transmission time units. For example, when the first resource message includes one transmission time unit, the offset value may be an offset value corresponding to the transmission time unit. For another example, when the first resource message includes a plurality of transmission time units, the offset value may be an offset value corresponding to each of the plurality of transmission time units. For still another example, when the first resource message includes a set of a plurality of transmission time units, the offset value may be an offset value corresponding to the set. Neither a quantity of transmission time units nor a quantity of offset values in the first resource message in this application is limited.

Step S202: The user equipment determines a time-frequency resource location of a physical channel or a physical signal in the transmission time unit based on the transmission time unit and the offset value.

An implementation method of step S202 may be the following manners, and may be as follows:

If the offset value is the quantity of symbols included in the non-MBSFN region, namely, $X_1$, the user equipment determines that the time-frequency resource location of the physical channel or the physical signal in the first slot of the MBSFN subframe is an $(X_1+1)^{th}$ symbol and a symbol following the $(X_1+1)^{th}$ symbol.

Step S203: The base station sends data to the user equipment on the time-frequency resource location in the transmission time unit, where the transmission time unit and the offset value are used to determine the time-frequency resource location of the physical channel or the physical signal in the transmission time unit.

A manner of determining by the user equipment in step S202 is the same as a manner of determining by the base station in step S203. The determining manner may be that the base station notifies the user equipment of the time-frequency resource location, or may be that the user equipment and the base station preconfigure the time-frequency resource location.

If the time-frequency resource location is the $(X_1+1)^{th}$ symbol and the symbol following the $(X_1+1)^{th}$ symbol in the first slot of the MBSFN subframe, the base station sends data to the user equipment in the $(X_1+1)^{th}$ symbol and the symbol following the $(X_1+1)^{th}$ symbol in the first slot of the MBSFN subframe.

FIG. 2 describes the resource mapping method provided in the present invention from a perspective of an entire procedure. FIG. 2 may also be a schematic diagram of a plurality of different processes obtained through division from a perspective of each device. For example, in FIG. 2, step S202 provides a resource mapping method from a perspective of the user equipment, and step S201 and step S203 provide a resource configuration method from a perspective of the base station.

According to the technical solution provided in this embodiment of this application, the user equipment receives the first resource message sent by the base station, obtains the transmission time unit and the offset value based on the first resource message, and determines, based on the offset value, that the time-frequency resource location of the physical signal or the physical channel in the transmission time unit is the $(X_1+1)^{th}$ symbol and the symbol following the $(X_1+1)^{th}$ symbol. The user equipment does not have a physical signal or a physical channel in first $X_1$ symbols of the transmission time unit, and an LTE device maps a resource of a physical signal or a physical channel to the first $X_1$ symbols of the transmission time unit. In this case, the time-frequency resource location of the physical signal or the physical channel of the user equipment in the transmission time unit is the $(X_1+1)^{th}$ symbol and the symbol following the $(X_1+1)^{th}$ symbol, and the time-frequency resource location of the physical signal or the physical channel of the LTE device in the transmission time unit is the first $X_1$ symbols. Therefore, symbols of the time-frequency resource locations of the user equipment and the LTE device in the transmission time unit are different, and the user equipment does not interfere with the LTE device on a time-frequency resource.

Figure 3A:
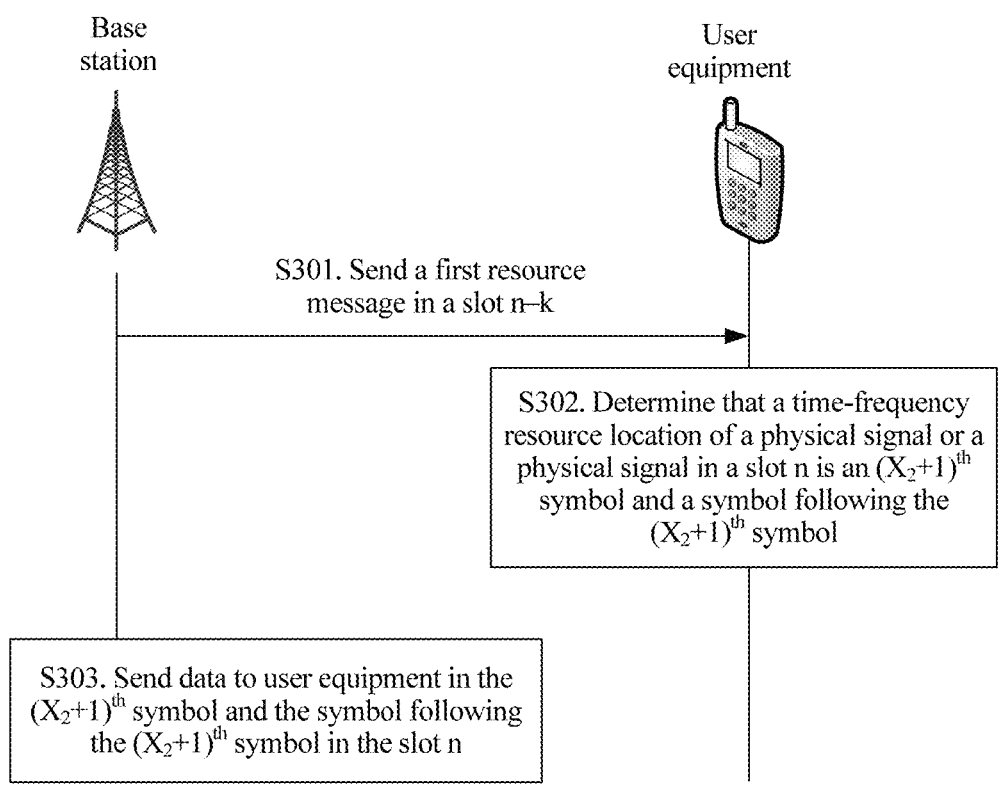
FIG. 3A is a flowchart of a resource mapping method according to another embodiment of this application.

FIG. 3A shows a resource mapping method according to another embodiment of this application. This embodiment is applied to the architecture shown in FIG. 1A. A base station sends a first resource message to user equipment (a 5G device). The first resource message is used to indicate that a transmission time unit and an offset value used for a physical signal or a physical channel of an LTE device on a first frequency domain resource, a physical signal or a physical channel of the user equipment is transmitted by using the transmission time unit and the offset value on a second frequency domain resource. An overlapping manner of the first frequency domain resource and the second frequency domain resource is entire overlapping shown in FIG. 1C. The transmission time unit in the method may be a slot n, where n is an integer greater than or equal to 0, and n is a sequence number of the slot. An LTE frame may include 10 subframes, and each subframe may include two slots. One LTE frame includes 20 slots (namely, a slot 0 to a slot 19), and the slot n indicates an $(n+1)^{th}$ slot of the LTE frame. The slot n in this embodiment may be the first slot of an MBSFN subframe. As shown in FIG. 3A, the method includes the following steps.

Step S301: The base station sends a first resource message to the user equipment in a slot n-k, where the first resource message may include a slot n and an offset value $X_2$ of the slot n.

The slot n-k may be a slot in which downlink control information can be transmitted. For example, one of k (for example, a value of k is any one of 1, 2, 3, 4, 5, and 6) slots preceding the slot n is used to transmit the first resource message, and one slot preceding the slot n is preferentially selected to transmit the first resource message, in other words, that k=1 is preferentially selected. For example, if n=2 and k=1, the base station sends the first resource message to the user equipment in a slot 1, where the first resource message includes a slot 2 and an offset value $X_2$ of the slot 2.

Step S302: The user equipment determines that a time-frequency resource location of a physical signal or a physical channel in the slot n is an $(X_2+1)^{th}$ symbol and a symbol following the $(X_2+1)^{th}$ symbol.

Step S303: The base station sends data to the user equipment in the $(X_2+1)^{th}$ symbol and the symbol following the $(X_2+1)^{th}$ symbol in the slot n, where the slot n and the offset value $X_2$ of the slot n are used to determine that the time-frequency resource location of the physical signal or the physical channel in the slot n is the $(X_2+1)^{th}$ symbol and the symbol following the $(X_2+1)^{th}$ symbol.

FIG. 3A describes the resource mapping method provided in the present invention from a perspective of an entire procedure. FIG. 3A may also be a schematic diagram of a plurality of different processes obtained through division from a perspective of each device. For example, in FIG. 3A, step S302 provides a resource mapping method from a perspective of the user equipment, and step S301 and step S303 provide a resource configuration method from a perspective of the base station.

According to the technical solution provided in the another embodiment of this application, when the first frequency domain resource and the second frequency domain resource entirely overlap, the user equipment receives the first resource message in the transmission time unit slot n-k, the user equipment obtains the slot n (the first slot of an MBSFN subframe) and the offset value $X_2$ based on the first resource message, and the user equipment determines, based on the offset value $X_2$, that the time-frequency resource location of the physical signal or the physical channel in the slot n is the $(X_2+1)^t$ symbol and the symbol following the $(X_2+1)^{th}$ symbol. The time-frequency resource location of the user equipment in the slot n is the $(X_2+1)^{th}$ symbol and the symbol following the $(X_2+1)^{th}$ symbol, and a time-frequency resource location of a physical signal or a physical channel of the LTE device in the slot n is first $X_2$ symbols. Therefore, symbols of the time-frequency resource locations of the user equipment and the LTE device in the slot n are different, and the user equipment does not interfere with the LTE device on a time-frequency resource.

Figure 3B:
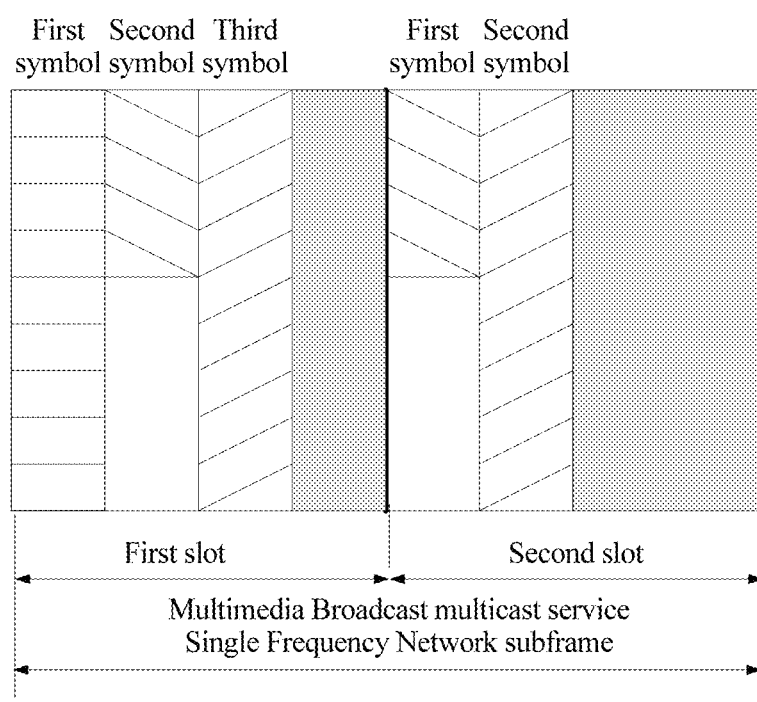
FIG. 3B is a schematic diagram of a time-frequency resource location according to another embodiment of this application.

FIG. 3B is a schematic diagram of a time-frequency resource location that is of a physical signal or a physical channel and that is determined by user equipment. For a slot n in FIG. 3B, n=2 and $X_2$=1. As shown in FIG. 3B, a physical channel or a physical signal of an LTE device is located on a first symbol location (namely, a horizontal line location shown in FIG. 3B) in the slot 2, and a physical channel or a physical signal of the user equipment is located in the second symbol (an NR control region, namely, a left slant) and the third symbol (a demodulation reference signal (DMRS) region, namely, a right slant) in the slot 2. A location of a physical channel or a physical signal of the user equipment in a slot 3 has no offset. Gray locations in the slot 2 and the slot 3 may be NR data regions. As shown in FIG. 3B, the physical channel or the physical signal of the LTE device is located in the first symbol in the slot 2, and the physical channel or the physical signal of the user equipment is located in the second symbol and a symbol following the second symbol in the slot 2. Therefore, resource mapping is performed by using different symbols for the user equipment and the LTE device, and no interference occurs between the physical channels or the physical signals of the user equipment and the LTE device.

Figure 4A:
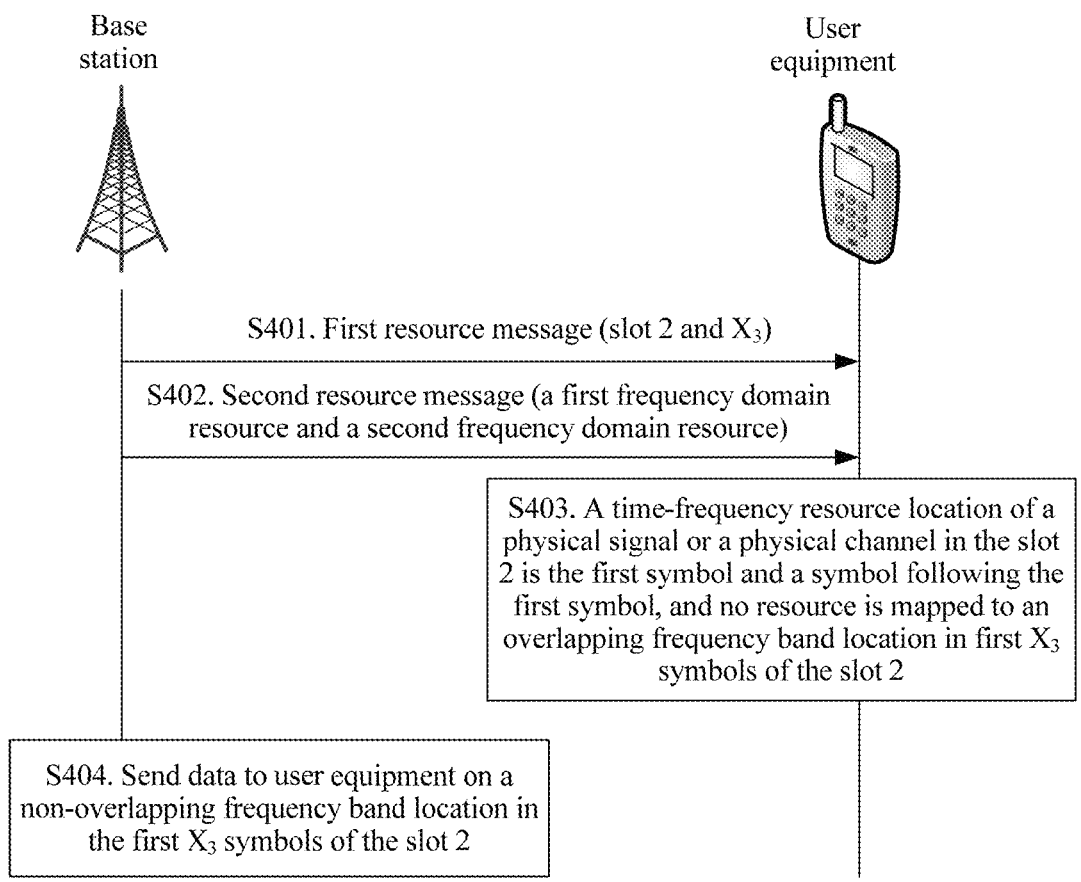
FIG. 4A is a flowchart of a resource mapping method according to still another embodiment of this application.

FIG. 4A shows a resource mapping method according to still another embodiment of this application. This embodiment is applied to the system architecture shown in FIG. 1A. A base station sends a first resource message to user equipment (a 5G device). The first resource message is used to indicate that a transmission time unit and an offset value used for a physical signal or a physical channel of an LTE device on a first frequency domain resource, a physical signal or a physical channel of the user equipment is transmitted by using the transmission time unit and the offset value on a second frequency domain resource. An overlapping manner of the first frequency domain resource and the second frequency domain resource is partial overlapping shown in FIG. 1B or excessive overlapping shown in FIG. 1D. An example in which the transmission time unit is the first slot of an MBSFN subframe is used in this embodiment. For example, the first slot is denoted as a slot 2 herein for ease of description. In other words, for a transmission time unit m, m is equal to 2. A transmission time unit m-k is a slot preceding the MBSFN subframe. For example, when k=1, the transmission time unit m-k may be a slot 1. Alternatively, the time unit may be a subframe. As shown in FIG. 4A, the method includes the following steps.

Step S401: The base station sends a first resource message to the user equipment, where the first resource message may include a slot 2 and an offset value $X_3$ of the slot 2.

Step S402: The base station sends a second resource message to the user equipment, where the second resource message includes a first frequency domain resource (for example, an LTE carrier) and a second frequency domain resource (for example, an NR carrier), and the first frequency domain resource may include frequency domain bandwidth information and frequency domain location information of a subcarrier.

There may be one or more pieces of frequency domain bandwidth information, and there may also be one or more pieces of frequency domain location information of the subcarrier. Neither a quantity of pieces of frequency domain bandwidth information nor a quantity of pieces of frequency domain location information of the subcarrier is limited in this application.

The frequency domain location information of the subcarrier may be expressed in the following manner. For example, the frequency domain bandwidth information and a location of a center frequency of the subcarrier may be directly carried, and may be 10 MHz and 2020 MHz, where 10 MHz indicates that a bandwidth value of the LTE carrier is 10 MHz, and 2020 MHz indicates that the center frequency of the subcarrier is 2020 MHz. For another example, the frequency domain bandwidth information and a frequency domain offset Y ($Y=y\times100$ KHz) between the subcarrier and a reference subcarrier may be carried, where $y\times100$ KHz indicates an offset between a center frequency of the subcarrier and a center frequency of the reference subcarrier. For example, $1\times100$ KHz indicates that the offset between the center frequency of the subcarrier and the center frequency of the reference subcarrier is 100 KHz, and $-1\times100$ KHz indicates that the offset between the center frequency of the subcarrier and the center frequency of the reference subcarrier is $-100$ KHz. That y is a positive number indicates that the center frequency has an upward offset, and that y is a negative number indicates that the center frequency has a downward offset. Certainly, in actual application, that y is a positive number may alternatively indicate that the center frequency has a downward offset, and that y is a negative number may alternatively indicate that the center frequency has an upward offset.

Step S403: The user equipment determines that a time-frequency resource location of a physical signal or a physical channel in the slot 2 of the user equipment is the first symbol and a symbol following the first symbol, where no resource is mapped to a third frequency domain resource in first $X_3$ symbols of the slot 2, and the third frequency domain resource is an overlapping frequency location of the first frequency domain resource and the second frequency domain resource.

A method for calculating the overlapping frequency band location in step S403 may be as follows: For example, if the first frequency domain resource is 10 MHz (bandwidth) and 2020 MHz (center frequency location), and the second frequency domain resource is 20 MHz (bandwidth) and 2025 MHz (center frequency location), the overlapping frequency band location of the first frequency domain resource and the second frequency domain resource may be from 2015 MHz to 2025 MHz, and a non-overlapping frequency band location may be from 2025 MHz to 2035 MHz.

Step S404: The base station sends data to the user equipment on a non-overlapping frequency band location in the first $X_3$ symbols of the slot 2, where the slot 2 and $X_3$ are used to determine that the time-frequency resource location of the physical signal or the physical channel in the slot 2 is the first symbol and the symbol following the first symbol, and no resource is mapped to the third frequency domain resource in the first $X_3$ symbols of the slot 2.

FIG. 4A describes the resource mapping method provided in the present invention from a perspective of an entire procedure. FIG. 4A may also be a schematic diagram of a plurality of different processes obtained through division from a perspective of each device. For example, in FIG. 4A, step S403 provides a resource mapping method from a perspective of the user equipment, and step S401, step S402, and step S404 provide a resource configuration method from a perspective of the base station.

Figure 4B:
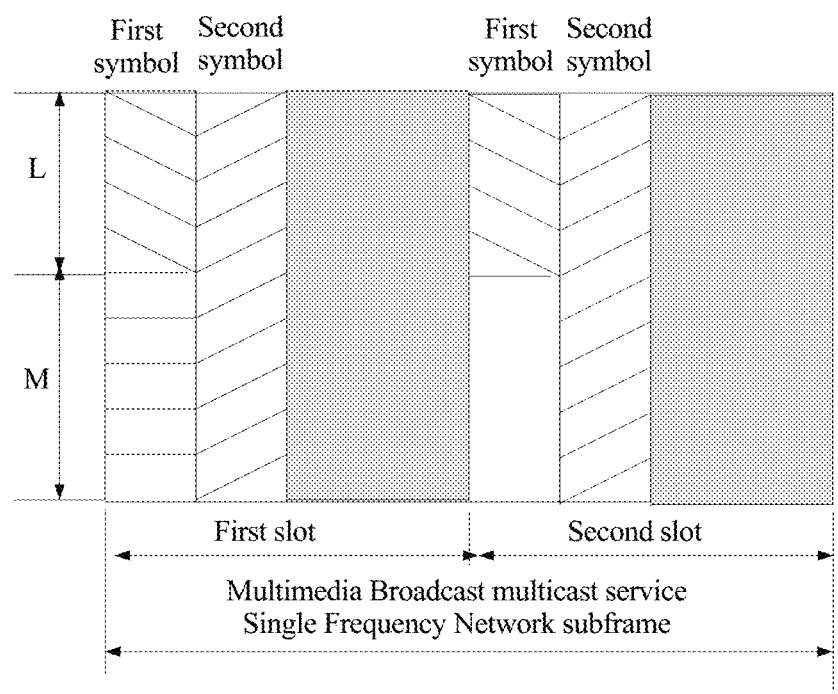
FIG. 4B is a schematic diagram of a time-frequency resource location according to still another embodiment of this application.

FIG. 4B is a schematic diagram of a time-frequency resource location that is of a physical signal or a physical channel and that is determined by user equipment. In FIG. 4B, $X_3$=1. As shown in FIG. 4B, a physical channel or a physical signal of an LTE device is located on a first frequency domain resource location of the first symbol in a slot 2, no resource of a physical channel or a physical signal of the user equipment is mapped to an overlapping frequency band location (for example, an M location in FIG. 4B) of the first symbol in the slot 2, and the physical channel or the physical signal of the user equipment is located on a non-overlapping frequency band location (for example, an L location in FIG. 4B) of the first symbol in the slot 2. As shown in FIG. 4B, the physical channel or the physical signal of the LTE device is located on the M location of the first symbol in the slot 2, and the physical channel or the physical signal of the user equipment is located on the L location of the first symbol in the slot 2. Therefore, different frequency band locations are configured in the first symbol in the slot 2 for the LTE device and the user equipment, to avoid interference between the LTE device and the user equipment, and no interference occurs between the user equipment and the LTE device.

Figure 5A:
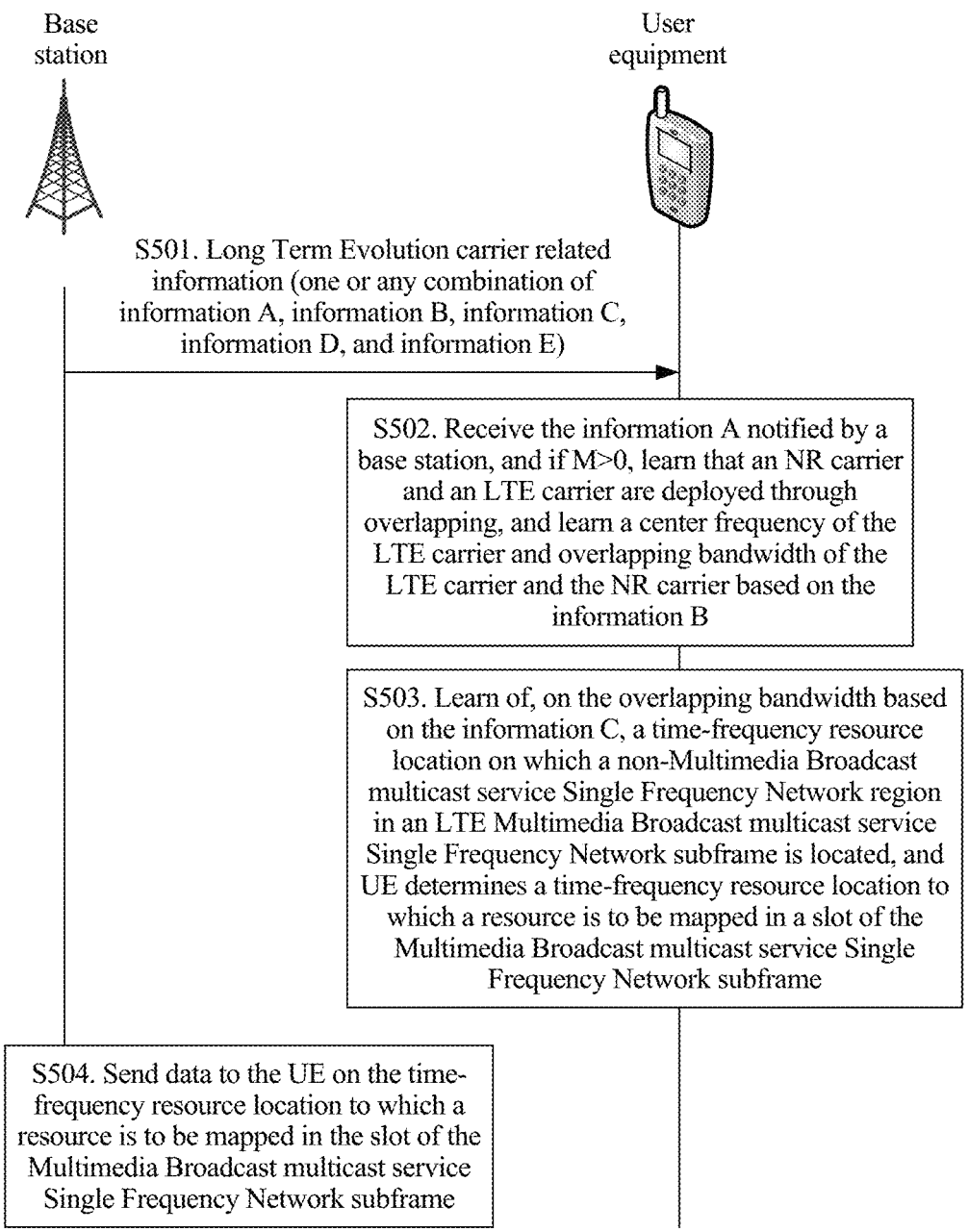
FIG. 5A is a flowchart of a resource mapping method according to yet another embodiment of this application.

Yet another embodiment of this application provides a resource mapping method. The method is implemented by using the system architecture shown in FIG. 1A. There is an LTE carrier between a base station and a 4G device, and there is an NR carrier between the base station and a 5G device. The 5G device may be NR UE, and the 4G device may be LTE UE. The LTE carrier and the NR carrier coexist on same spectrum bandwidth. An overlapping manner of the LTE carrier and the NR carrier includes but is not limited to partial overlapping, entire overlapping, and excessive overlapping. An example in which a transmission time unit is a slot is used in this embodiment. The slot may be the first slot of an MBSFN subframe. As shown in FIG. 5A, the method includes the following steps.

Step S501: The base station sends LTE carrier related information to the NR UE.

A form of sending includes but is not limited to any one of broadcast information, system information, or radio resource control (RRC) signaling.

The LTE carrier related information may include one or more of the following information:

information A: An NR carrier and M LTE carriers are deployed through overlapping (for example, through one of partial overlapping, entire overlapping, or excessive overlapping), where M is an integer greater than or equal to 0, and when M=0, it indicates that no LTE carrier and the NR carrier are deployed through overlapping;

information B: bandwidth information of the M LTE carriers deployed through overlapping, where for each LTE carrier, a bandwidth value and a direct current (DC) subcarrier location of the LTE carrier are notified, where for a representation manner of the DC subcarrier location of the LTE carrier, refer to the description of step S402, and details are not described herein again;

information C: MBSFN configuration information of the M LTE carriers deployed through overlapping, where the MBSFN configuration information may include a period of an MBSFN subframe, a period offset (offset), an identifier of the MBSFN subframe (indicating which subframe is the MBSFN subframe), and a quantity (namely, a value of X) of symbols included in a non-MBSFN region;

information D: sounding reference signal (SRS) subframe configuration information of the M LTE carriers deployed through overlapping, where when time division duplex (TDD) is used for the LTE carrier, a quantity of uplink symbols included in an LTE special subframe is notified, and the special subframe may include a downlink symbol, a guard period GP, and an uplink symbol;

information E: quantities of resource blocks (RB) included in physical uplink control channels (PUCCH) of the M LTE carriers deployed through overlapping; and information F: CRS configuration information of the M LTE carriers deployed through overlapping.

Step S502: The UE receives the information A notified by the base station, and if M>0, learns that an NR carrier and an LTE carrier are deployed through overlapping, and may learn a center frequency of the LTE carrier and an overlapping frequency location of the LTE carrier and the NR carrier based on information B.

Step S503: The UE learns of, on the overlapping frequency location based on information C, a time-frequency resource location on which a non-MBSFN region in an LTE MBSFN subframe is located, and the UE determines a time-frequency resource location to which a resource is to be mapped in a slot (slot) of the MBSFN subframe.

Step S504: The base station sends data to the UE on the time-frequency resource location to which a resource is to be mapped in the slot (slot) of the MBSFN subframe.

A specific implementation method may be as follows: For example, if M=1, the UE learns a frequency domain location of the LTE carrier based on the information B, and determines whether the LTE carrier and the NR carrier are deployed through entire overlapping.

Figure 5B:
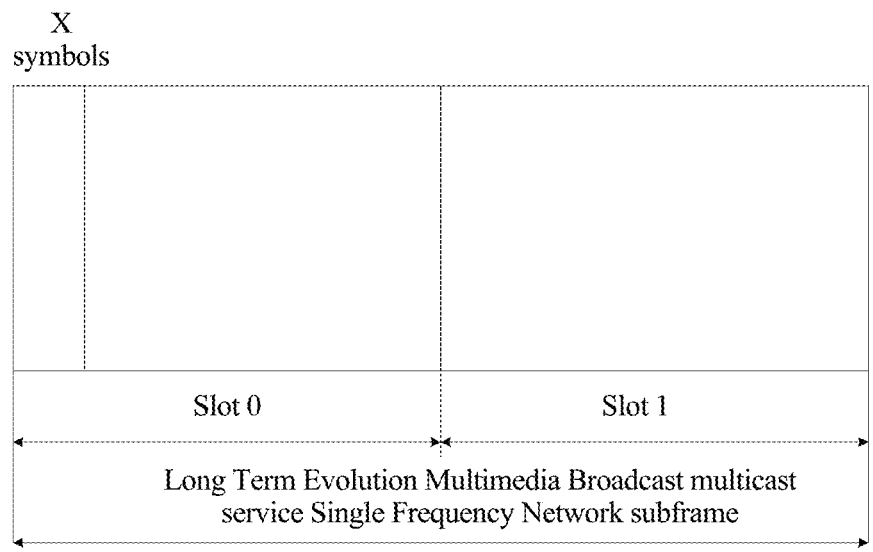
FIG. 5B is a schematic diagram of an LTE MBSFN subframe.

If the LTE carrier and the NR carrier are deployed through entire overlapping, the base station notifies the NR UE of configuration information of an LTE MBSFN subframe, including an identifier of the MBSFN subframe and a quantity (namely, a value of X in FIG. 5B, where X may be 0, 1 or 2) of symbols in a non-MBSFN region in the MBSFN subframe. After receiving the LTE carrier related information (the information A, the information B, and the information C), the UE learns of a time domain location of the MBSFN subframe and the value of X. It is assumed that X=1.

Figure 5C:
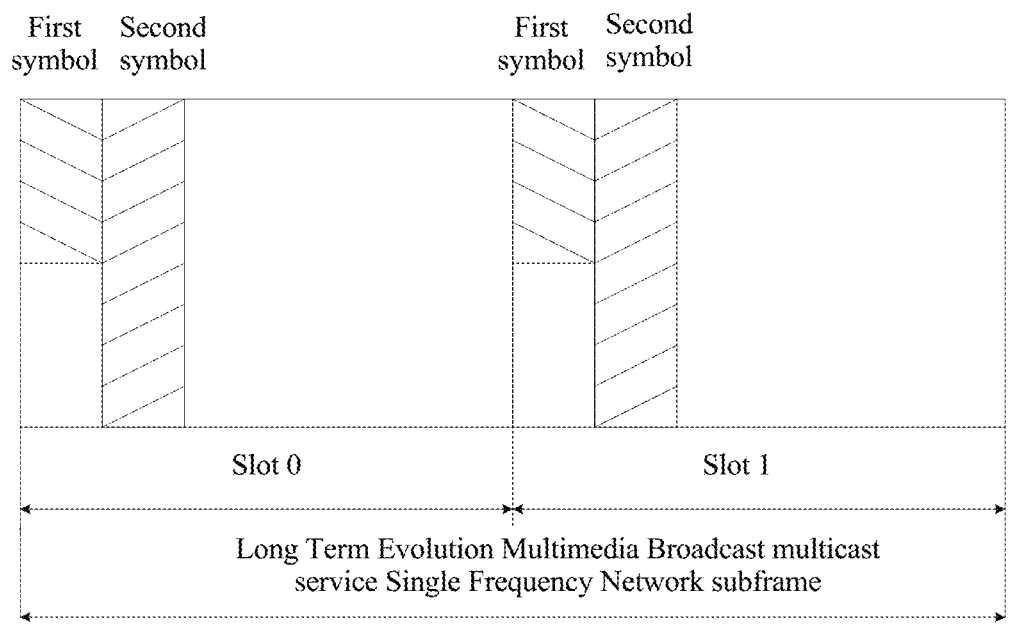
FIG. 5C is a schematic diagram of an NR slot.

FIG. 5C is a schematic diagram of an LTE MBSFN subframe. As shown in FIG. 5C, in the first slot of the LTE MBSFN subframe, a start location to which a downlink channel (for example, a PDCCH or a physical downlink shared channel (PDSCH)) and a downlink signal (DMRS) of an NR carrier are mapped is the second symbol (in other words, a symbol included in a non-MBSFN region in the LTE MBSFN subframe is shunned). As shown in FIG. 3B, the PDCCH of the NR carrier is mapped to the second symbol, and the DMRS is mapped to the third symbol. In the second slot of the LTE MBSFN subframe, a start location to which a downlink channel of the NR carrier is mapped has no offset. In other words, mapping starts from the first symbol.

If the LTE carrier and the NR carrier are not deployed through entire overlapping, as shown in FIG. 4B, a part of bandwidth of the NR carrier cannot be used by the LTE carrier. The UE may learn of a time domain location of an LTE MBSFN subframe and a value of X based on configuration information (the information A, the information B, and the information C) that is of the MBSFN subframe and that is indicated by the base station to the NR UE. It is assumed that X=1.

On the first symbol of the first slot of the LTE MBSFN subframe, as shown in FIG. 4B, the NR UE assumes that the base station does not send a downlink signal in an LTE-NR overlapping frequency band, in other words, considers that an overlapping frequency band in a symbol 0 is a blank resource, and a start location to which a downlink channel (for example, a PDCCH or a PDSCH) and a downlink signal (DMRS) of the NR carrier are mapped has no offset, and still starts from the symbol 0. In the second slot of the MBSFN subframe, a start location to which a channel and a signal of the NR carrier are mapped has no offset either.

Optionally, step S503 may be replaced with the following step:

Step S503-1: The NR UE learns, based on the information A, the information B, and information D, a time-frequency resource location that may be used by an LTE SRS, and does not send uplink data information on the time-frequency resource location.

Optionally, step S503 may be replaced with the following step:

Step S503-2: The NR UE learns, based on the information A, the information B, and information E, a time-frequency resource location used by an LTE PUCCH, and does not send uplink data information on the time-frequency resource location.

Optionally, step S503 may be replaced with the following step:

Step S503-3: The NR UE learns, based on the information A, the information B, and information F, a time-frequency resource location used by an LTE CRS, and assumes that the base station does not send NR data on the time-frequency resource location.

Figure 6A:
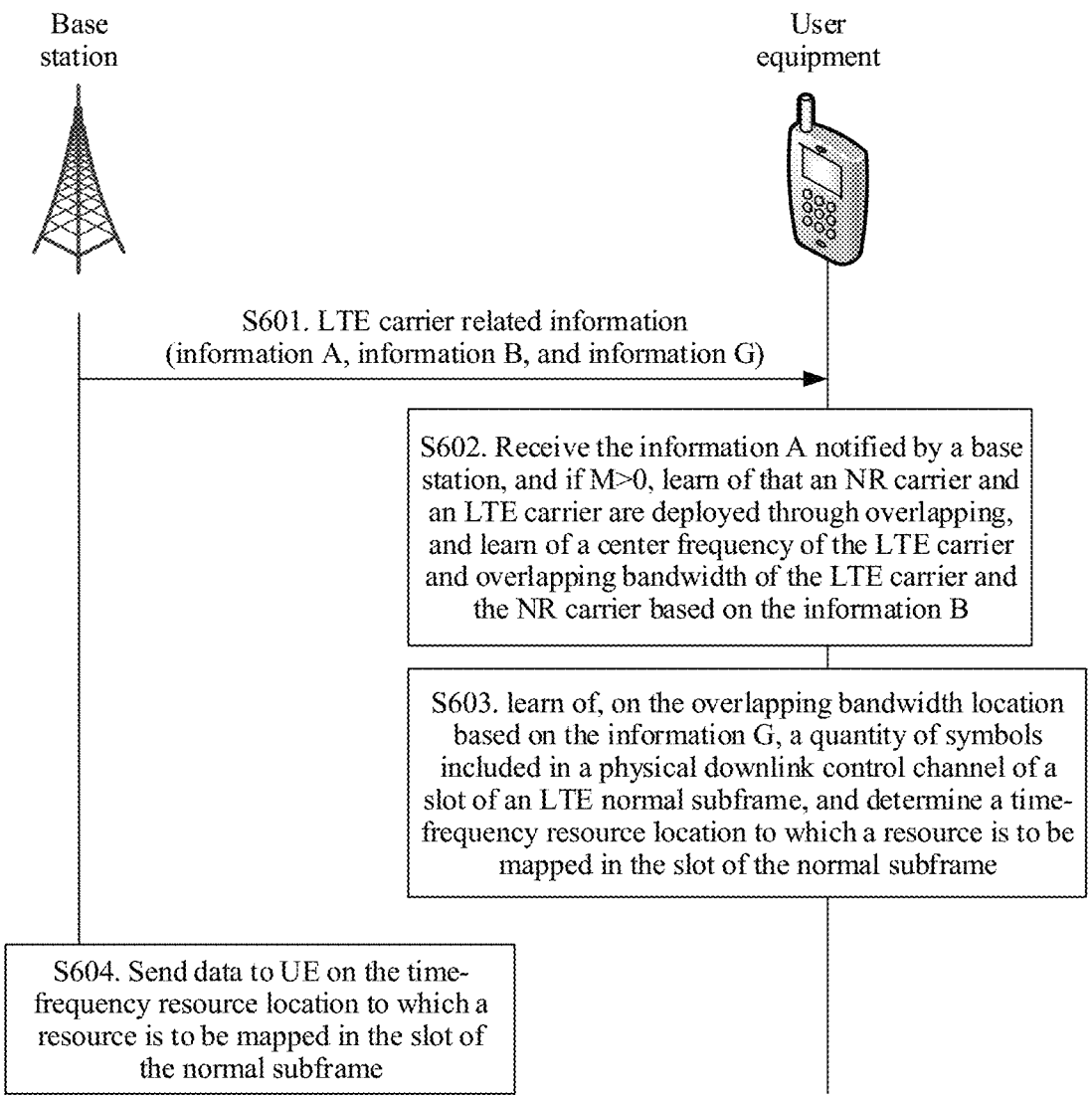
FIG. 6A is a flowchart of another resource mapping method according to an embodiment of this application.

Still yet another embodiment of this application provides a resource mapping method. The method is implemented by using the system architecture shown in FIG. 1A. There is an LTE carrier between a base station and a 4G device, and there is an NR carrier between the base station and a 5G device. The 5G device may be NR UE, and the 4G device may be LTE UE. The LTE carrier and the NR carrier coexist on same spectrum bandwidth. An example in which a transmission time unit is a slot of a normal subframe is used in this embodiment. As shown in FIG. 6A, the method includes the following steps.

Step S601: The base station sends LTE carrier related information to the NR UE.

The LTE carrier related information may include the foregoing information A, the foregoing information B, and information G.

The information G is a slot of a normal subframe of M LTE carriers deployed through overlapping and a quantity X of symbols included in a PDCCH in the slot.

The base station may choose to send the LTE carrier related information in one of K slots preceding the slot of the normal subframe, where that k=1 is preferentially selected.

Step S602: The UE receives the information A notified by the base station, and if M>0, learns that an NR carrier and an LTE carrier are deployed through overlapping, and may learn of a center frequency of the LTE carrier and an overlapping bandwidth location of the LTE carrier and the NR carrier based on information B.

Step S603: The UE learns, on the overlapping bandwidth location based on information G, a quantity of symbols included in a PDCCH in a slot of an LTE normal subframe, namely, a time-frequency resource location, and determines a time-frequency resource location to which a resource is to be mapped in the slot (slot) of the normal subframe.

Step S604: The base station sends data to the UE on the time-frequency resource location to which a resource is to be mapped in the slot (slot) of the normal subframe.

An implementation method of step S603 may be as follows:

The base station notifies the NR UE that one LTE carrier and the NR carrier are deployed through overlapping, and notifies a DC subcarrier location and bandwidth information of the LTE carrier. After receiving the notification, the NR UE learns a frequency domain location of the LTE carrier, and determines whether the LTE carrier and the NR carrier are deployed through entire overlapping.

Figure 6B:
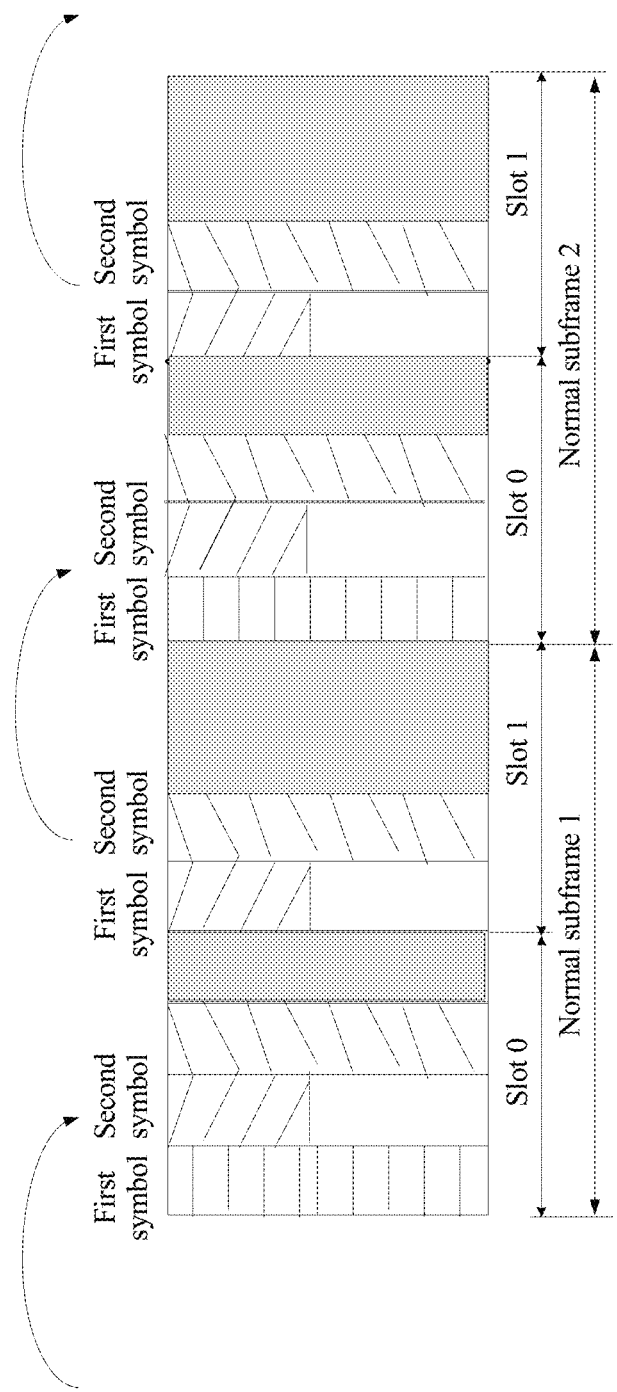
FIG. 6B is a schematic diagram of a slot of a common subframe according to an embodiment of this application.

If the LTE carrier and the NR carrier are deployed through entire overlapping, the base station notifies, in a second slot of an LTE downlink subframe or special subframe (a subframe 1 in FIG. 6B), the UE of a quantity X (for example, X=1 in FIG. 6B) of symbols in which an LTE PDCCH in a slot of a next downlink subframe or special subframe (a subframe 2 in FIG. 6B) is located. In a first slot of the subframe 2 in FIG. 6B, a start location to which a downlink channel (for example, a PDCCH or a PDSCH) or a downlink signal (DMRS) of the NR carrier is mapped is the second symbol (in other words, the symbol included in the LTE PDCCH is shunned). An arrow shown in FIG. 6B indicates that a quantity (namely, a value of X) of symbols included in an LTE PDCCH in a next D (downlink) or S (special) subframe is received from K preceding slots.

Figure 6C:
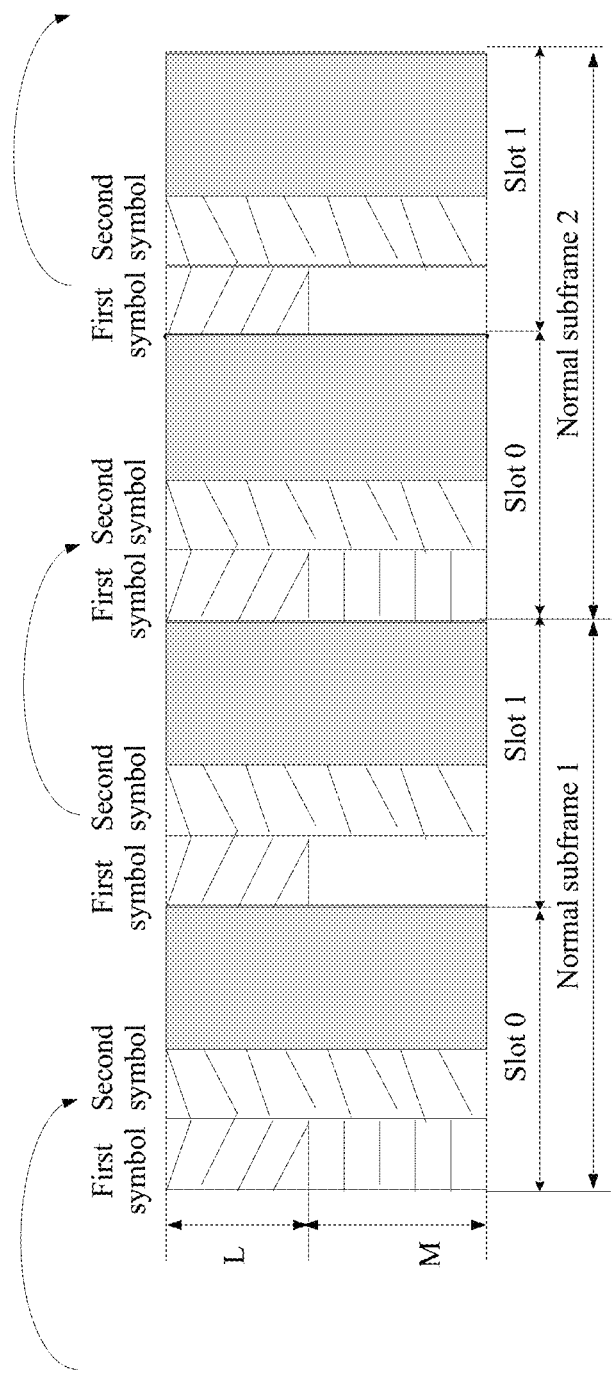
FIG. 6C is another schematic diagram of a slot of a common subframe according to an embodiment of this application.

If the LTE carrier and the NR carrier are not deployed through entire overlapping, a part of bandwidth of the NR carrier cannot be used by the LTE carrier. The base station notifies, in a second slot of an LTE downlink subframe or special subframe (a subframe 1 in FIG. 6C), the UE of a quantity X (for example, X=1 in FIG. 6C) of symbols in which an LTE PDCCH in a next downlink subframe or special subframe (for example, a subframe 2 in FIG. 6C) is located. In the first slot of the subframe 2 in FIG. 6C, a start location to which a downlink channel and a downlink signal of the NR carrier are mapped has no offset (is still a first symbol). In first X (X=1 in FIG. 6C) symbols of the first slot of the subframe 2 in FIG. 6C, the NR UE assumes that the base station does not send a downlink signal on an LTE-NR overlapping frequency band, in other words, considers that an overlapping frequency band in the first symbol of the first slot of the subframe 2 is a blank resource. An arrow in FIG. 6C indicates that a quantity (namely, a value of X) of symbols included in an LTE PDCCH in a next D (downlink) or S (special) subframe is received from one preceding slot.

Figure 6D:
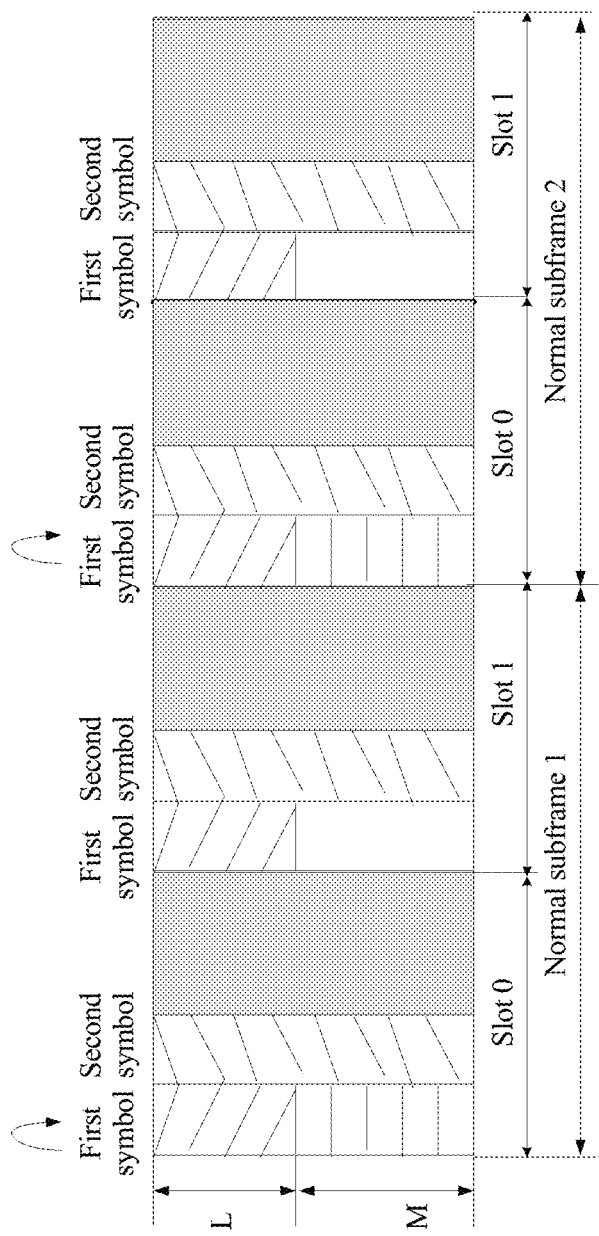
FIG. 6D is still another schematic diagram of a slot of a common subframe according to an embodiment of this application.

If the LTE carrier and the NR carrier are not deployed through entire overlapping, the base station notifies, in the first slot of an LTE downlink subframe or special subframe (a subframe 1 in FIG. 6D), a quantity X (for example, X=1) of symbols included in an LTE PDCCH in the current subframe. In the first slot of the subframe, a start location to which a downlink channel and a downlink signal of the NR carrier are mapped has no offset (is still a first symbol). In first X (X=1 in FIG. 6D) symbols of the first slot of the subframe 1 in FIG. 6D, the NR UE assumes that the base station does not send a downlink signal on an LTE-NR overlapping frequency band, in other words, considers that an overlapping frequency band on the first X symbols is a blank resource. An arrow in FIG. 6D indicates that a quantity (namely, a value of X) of symbols included in an LTE PDCCH in a current slot is received from the first slot of a current subframe.

In this embodiment of this application, when the LTE carrier and the NR carrier are deployed through entire overlapping, in one slot preceding next D (downlink) or S (special) subframe, a quantity X of symbols included in a PDCCH included in the first slot of the next D or S subframe is indicated, and a time domain location to which a channel is to be mapped in the first slot has an offset of X symbols. When the LTE carrier and the NR carrier are deployed through partial overlapping, in one slot preceding a D or S subframe, a quantity X of symbols included in a PDCCH included in a first slot of a next D or S subframe is indicated, or in the first slot of a D or S subframe, a quantity X of symbols included in an LTE PDCCH in the current slot is indicated. The NR UE assumes that the base station does not send a downlink signal on an LTE-NR overlapping frequency band, in other words, considers that an overlapping frequency band on first X symbols is a blank resource. In this embodiment of this application, when the LTE carrier and the NR carrier are deployed through overlapping, the NR carrier can be prevented from interference from a symbol in which a PDCCH in a normal downlink subframe or special subframe of the LTE carrier is located.

Figure 7:
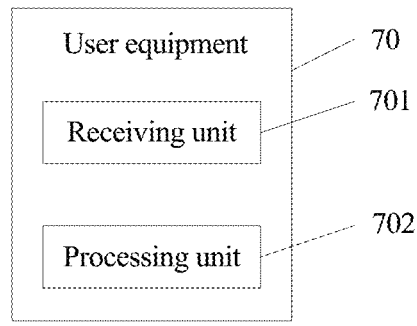
FIG. 7 is a structural block diagram of user equipment according to this application.

FIG. 7 shows user equipment 70 according to this application. The user equipment includes:

a receiving unit 701, configured to receive a first resource message sent by a base station, where the first resource message includes a transmission time unit and an offset value corresponding to the transmission time unit; and a processing unit 702, configured to determine a time-frequency resource location of a physical channel or a physical signal in the transmission time unit based on the transmission time unit and the offset value.

Optionally, the offset value is $X_1$, $X_1$ is an integer greater than 0, and the processing unit 702 is configured to determine that the time-frequency resource location of the physical channel or the physical signal in the transmission time unit is an $(X_1+1)^{th}$ symbol and a symbol following the $(X_1+1)^{th}$ symbol.

Optionally, the transmission time unit may be a transmission time unit n, the offset value is $X_2$, and $X_2$ is an integer greater than 0;

the receiving unit 701 is configured to receive the first resource message in a transmission time unit n-k, where n is a sequence number of the transmission time unit, and k is an integer greater than 0; and the processing unit 702 is configured to determine that the time-frequency resource location of the physical channel or the physical signal in the transmission time unit n is an $(X2+1)$th symbol and a symbol following the $(X2+1)$th symbol.

Optionally, a value of k is 1.

Optionally, the receiving unit 701 is further configured to receive a second resource message sent by the base station, where the second resource message includes a first frequency domain resource and a second frequency domain resource, the first frequency domain resource is a frequency domain location of data transmission of the user equipment, the second frequency domain resource includes frequency domain bandwidth information and frequency domain location information of a subcarrier, and the first frequency domain resource does not entirely overlap the second frequency domain resource.

Optionally, the frequency domain location information of the subcarrier is a frequency domain offset Y between the subcarrier and a preconfigured reference subcarrier.

Optionally, the offset value is $X_3$, $X_3$ is an integer greater than 0, and the processing unit 702 is configured to determine that the time-frequency resource location of the physical signal or the physical channel in the transmission time unit is the first symbol and a symbol following the first symbol, where no resource is mapped to a third frequency domain resource in first $X_3$ symbols of the transmission time unit, and the third frequency domain resource is an overlapping frequency location of the first frequency domain resource and the second frequency domain resource.

Optionally, the transmission time unit may be a transmission time unit m, the offset value is $X_4$, and $X_4$ is an integer greater than 0;

the receiving unit 701 is configured to receive the first resource message in a transmission time unit m-k, where k is an integer greater than or equal to 0; and the processing unit 702 is configured to determine that the time-frequency resource location of the physical signal or the physical channel in the transmission time unit m is the first symbol and a symbol following the first symbol, where no resource is mapped to a third frequency domain resource in first X4 symbols of the transmission time unit m, and the third frequency domain resource is an overlapping frequency location of the first frequency domain resource and the second frequency domain resource.

Optionally, the offset value is $X_5$, $X_5$ is an integer greater than 0, and the processing unit 702 is configured to determine that the time-frequency resource location of the physical signal or the physical channel in the transmission time unit is the first symbol and a symbol following the first symbol, where no resource is mapped to a third frequency domain resource in last $X_5$ symbols of the transmission time unit, and the third frequency domain resource is an overlapping frequency location of the first frequency domain resource and the second frequency domain resource.

Optionally, the first frequency domain resource is a new technology NR carrier, and the second frequency domain resource is a Long Term Evolution LTE carrier.

For technical effects and detailed solutions of the user equipment provided in this application, refer to descriptions in the embodiments shown in FIG. 2, FIG. 3A, FIG. 4A, FIG. 5A, and FIG. 6A. Details are not described herein again.

Figure 8:
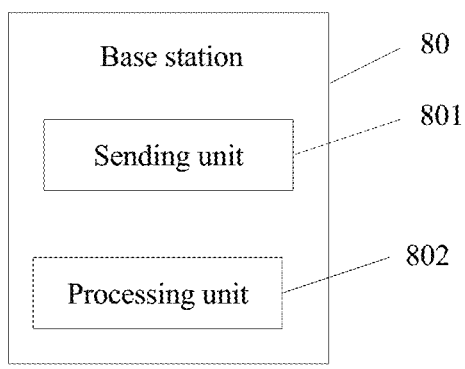
FIG. 8 is a structural block diagram of a base station according to this application.

FIG. 8 shows a base station according to an embodiment of this application. As shown in FIG. 8, the base station includes:

a sending unit 801, configured to send a first resource message to user equipment, where the first resource message includes a transmission time unit and an offset value corresponding to the transmission time unit, and the transmission time unit and the offset value are used to determine a time-frequency resource location of a physical channel or a physical signal in the transmission time unit; and a processing unit 802, configured to control the sending unit 801 to send data to the user equipment on the time-frequency resource location in the transmission time unit.

Optionally, the offset value is $X_1$, $X_1$ is an integer greater than 0, and the transmission time unit and $X_1$ are used to determine that the time-frequency resource location of the physical channel or the physical signal in the transmission time unit is an $(X_1+1)^{th}$ symbol and a symbol following the $(X_1+1)^{th}$ symbol.

Optionally, the transmission time unit is a transmission time unit n, the offset value is $X_2$, and $X_2$ is an integer greater than 0; the sending unit 801 is configured to send the first resource message in a transmission time unit n-k, where n is a sequence number of the transmission time unit, and k is an integer greater than 0; and the transmission time unit n and $X_2$ are used to determine that the time-frequency resource location of the physical channel or the physical signal in the transmission time unit n is an $(X_2+1)^{th}$ symbol and a symbol following the $(X_2+1)^{th}$ symbol.

Optionally, k=1.

Optionally, the sending unit 801 is configured to send a second resource message to the user equipment, where the second resource message includes a first frequency domain resource and a second frequency domain resource, the first frequency domain resource is a frequency domain location of data transmission of the user equipment, the second frequency domain resource includes frequency domain bandwidth information and frequency domain location information of a subcarrier, and the first frequency domain resource does not entirely overlap the second frequency domain resource.

Optionally, the frequency domain location information of the subcarrier is a frequency domain offset Y between the subcarrier and a preconfigured reference subcarrier.

Optionally, the offset value is $X_3$, and $X_3$ is an integer greater than 0; and the transmission time unit and $X_3$ are used to determine that the time-frequency resource location of the physical signal or the physical channel in the transmission time unit is the first symbol and a symbol following the first symbol, no resource is mapped to a third frequency domain resource in first $X_3$ symbols of the transmission time unit, and the third frequency domain resource is an overlapping frequency location of the first frequency domain resource and the second frequency domain resource.

Optionally, the transmission time unit is a transmission time unit m, the offset value is $X_4$, and $X_4$ is an integer greater than 0; the sending unit 801 is configured to send the first resource message in a transmission time unit m-k, where m is a sequence number of the transmission time unit, and k is an integer greater than 0; and the transmission time unit m and $X_4$ are used to determine that the time-frequency resource location of the physical signal or the physical channel in the transmission time unit m is the first symbol and a symbol following the first symbol, no resource is mapped to a third frequency domain resource in first $X_4$ symbols of the transmission time unit m, and the third frequency domain resource is an overlapping frequency location of the first frequency domain resource and the second frequency domain resource.

Optionally, the offset value is $X_5$, and $X_5$ is an integer greater than 0; and the transmission time unit and $X_5$ are used to determine that the time-frequency resource location of the physical signal or the physical channel in the transmission time unit is the first symbol and a symbol following the first symbol, no resource is mapped to a third frequency domain resource in last $X_5$ symbols of the transmission time unit, and the third frequency domain resource is an overlapping frequency location of the first frequency domain resource and the second frequency domain resource.

For technical effects and detailed solutions of the base station provided in this application, refer to descriptions in the embodiments shown in FIG. 2, FIG. 3A, FIG. 4A, FIG. 5A, and FIG. 6A. Details are not described herein again.

Figure 9:
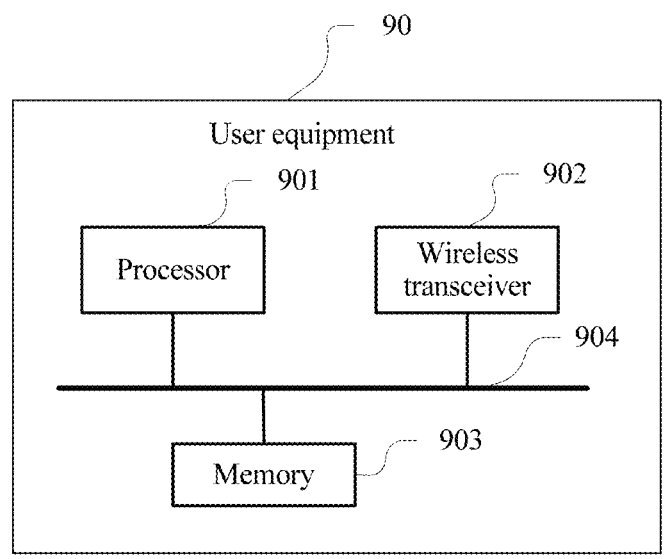
FIG. 9 is a schematic diagram of a hardware structure of user equipment according to this application.

FIG. 9 shows user equipment 900, including a processor 901, a wireless transceiver 902, a memory 903, and a bus 904. The wireless transceiver 902 is configured to receive data from an external device and send data to the external device. There may be one or more processors 901. In some embodiments of this application, the processor 901, the memory 903, and the transceiver 902 may be connected by using the bus 904 or in another manner. For meanings and examples of the terms in this embodiment, refer to the embodiments corresponding to FIG. 2, FIG. 3A, FIG. 4A, FIG. 5A, and FIG. 6A. Details are not described herein again.

The memory 903 stores program code. The processor 901 is configured to invoke the program code stored in the memory 903 to perform the following operations:

receiving, by using the wireless transceiver 902, a first resource message sent by a base station, where the first resource message includes a transmission time unit and an offset value corresponding to the transmission time unit; and determining a time-frequency resource location of a physical channel or a physical signal in the transmission time unit based on the transmission time unit and the offset value.

The processor 901 and the wireless transceiver 902 may be further configured to perform the steps in the embodiments corresponding to FIG. 2, FIG. 3A, FIG. 4A, FIG. 5A, and FIG. 6A, and details are not described herein again.

Figure 10:
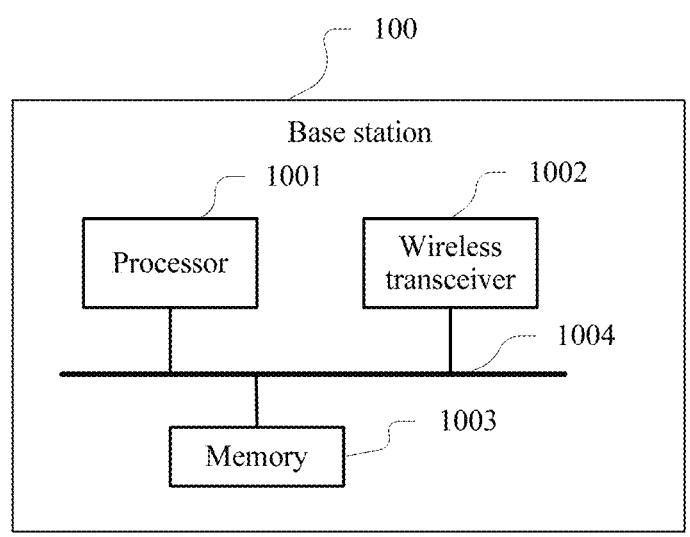
FIG. 10 is a schematic diagram of a hardware structure of a base station according to an embodiment of this application.

FIG. 10 shows a base station 100, including a processor 1001, a wireless transceiver 1002, a memory 1003, and a bus 1004. The wireless transceiver 1002 is configured to receive data from an external device and send data to the external device. There may be one or more processors 1001. In some embodiments of this application, the processor 1001, the memory 1003, and the transceiver 1002 may be connected by using the bus 1004 or in another manner. For meanings and examples of the terms in this embodiment, refer to the embodiments corresponding to FIG. 2, FIG. 3A, FIG. 4A, FIG. 5A, and FIG. 6A. Details are not described herein again.

The memory 1003 stores program code. The processor 1001 is configured to invoke the program code stored in the memory 1003 to perform the following operations:

sending, by using the wireless transceiver 1002, a first resource message to user equipment, where the first resource message includes a transmission time unit and an offset value corresponding to the transmission time unit, and the transmission time unit and the offset value are used to determine a time-frequency resource location of a physical channel or a physical signal in the transmission time unit; and sending data to the user equipment on the time-frequency resource location in the transmission time unit.

The processor 1001 and the wireless transceiver 1002 may be further configured to perform the steps in the embodiments corresponding to FIG. 2, FIG. 3A, FIG. 4A, FIG. 5A, and FIG. 6A, and details are not described herein again.

It should be noted that the processor herein may be one processing element or a general term for a plurality of processing elements. For example, the processing element may be a central processing unit (CPU) or an application-specific integrated circuit (ASIC), or may be configured as one or more integrated circuits implementing the embodiments of this application, for example, one or more microprocessors (DSP) or one or more field programmable gate arrays (FPGA).

The memory may be one storage apparatus or a general term for a plurality of storage elements, and is configured to store executable program code, or a parameter, data, and the like required for running an application program running apparatus. The memory may include a random access memory (RAM) or may include a non-volatile memory (non-volatile memory), such as a magnetic disk storage or a flash (Flash) memory.

The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9 or FIG. 10, but this does not mean that there is only one bus or only one type of bus.

The user equipment or the base station may further include an input/output apparatus connected to the bus, so that the input/output apparatus is connected to other parts such as the processor by using the bus. The input/output apparatus may provide an input interface for an operator, so that the operator selects a control option by using the input interface. Alternatively, the input/output apparatus may be another interface, and another external device may be connected by using this interface.

It should be noted that, for brief description, the foregoing method embodiments are represented as a combination of a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to preferred embodiments, and the involved actions and modules are not necessarily required by this application.

In the foregoing embodiments, the description of each embodiment has respective focuses. For a part that is not described in detail in an embodiment, refer to related descriptions in other embodiments.

The resource mapping method, the related device, and the apparatus provided in the embodiments of this application are described in detail above. The principle and implementations of this application are described herein by using specific examples. The description about the embodiments is merely provided to help understand the method and core ideas of this application. In addition, a person of ordinary skill in the art can make variations to this application in terms of the specific implementations and application scopes according to the ideas of this application. Therefore, the content of this specification shall not be construed as a limit to this application.

What is claimed is:

1. A communication method, comprising:
   receiving, by a device, a message via a frequency carrier of a second radio access technology from a network device;
   the message comprising first information and second information;
   the first information indicating a bandwidth of a frequency carrier of a first radio access technology and a center subcarrier location of the frequency carrier of the first radio access technology; and
   the second information indicating Multimedia Broadcast multicast service Single Frequency Network (MBSFN) subframe configuration information of the frequency carrier of the first radio access technology; and
   receiving, by the device, data from the network device via the frequency carrier of the second radio access technology by avoiding, according to the first information and the second information, a time-frequency resource location in an overlapping region of the frequency carrier of the first radio access technology and the frequency carrier of the second radio access technology.

2. The method according to claim 1, wherein the time-frequency resource location comprises:
   a frequency domain resource location of the time-frequency resource location indicated by the first information; and
   a time domain resource location of the time-frequency resource location indicated by the second information.

3. The method according to claim 2, wherein the time domain resource location of the time-frequency resource location is a time domain resource location of a non-MBSFN region in the MBSFN subframe.

4. The method according to claim 2, wherein the frequency domain resource location of the time-frequency resource location is a frequency domain resource location of the overlapping region of the frequency carrier of the first radio access technology and the frequency carrier of the second radio access technology.

5. The method according to claim 1, wherein the message further comprises third information, the third information indicating a cell-specific reference signal (CRS) configuration of the frequency carrier of the first radio access technology.

6. The method according to claim 1, wherein the message carries broadcast information or system information.

7. A non-transitory computer storage medium, wherein the computer storage medium is applied to a device, wherein the computer storage medium stores a program instruction, and wherein in response to the program instruction running, functions of the device in the method according to claim 1 are implemented.

8. The method according to claim 1, further comprising:
   determining, by the device, according to the first information and the second information, that the time-frequency resource location is not available for receiving the data from the network device via the frequency carrier of the second radio access technology.

9. A communication method, comprising:
   sending, by a device, a message via a frequency carrier of a second radio access technology to a terminal device;
   the message comprising first information and second information;
   the first information indicating a bandwidth of the frequency carrier of a first radio access technology and a center subcarrier location of the frequency carrier of the first radio access technology;

the second information indicating Multimedia Broadcast multicast service Single Frequency Network (MBSFN) subframe configuration information of the frequency carrier of the first radio access technology; and the first information and the second information indicating a time-frequency resource location in an overlapping region of the frequency carrier of the first radio access technology and the frequency carrier of the second radio access technology; and sending, by the device, data to the terminal device via the frequency carrier of the second radio access technology by avoiding the time-frequency resource location.

10. The method according to claim 9, wherein the time-frequency resource location comprises:

a frequency domain resource location of the time-frequency resource location indicated by the first information; and a time domain resource location of the time-frequency resource location indicated by the second information.

11. The method according to claim 10, wherein the time domain resource location of the time-frequency resource location is a time domain resource location of a non-MBSFN region in the MBSFN subframe.

12. The method according to claim 10, wherein the frequency domain resource location of the time-frequency resource location is a frequency domain resource location of the overlapping region of the frequency carrier of the first radio access technology and the frequency carrier of the second radio access technology.

13. The method according to claim 9, wherein the message further comprises third information, the third information indicating a cell-specific reference signal (CRS) configuration of the frequency carrier of the first radio access technology.

14. The method according to claim 9, wherein the message carries broadcast information or system information.

15. A device, comprising:

a processor; and an interface circuitry, wherein the processor and the interface circuitry are coupled with each other, and wherein the processor executes program instructions to cause the device to perform:

receiving a message via a frequency carrier of a second radio access technology from a network device, wherein:

the message comprises first information and second information;

the first information indicates a bandwidth of a frequency carrier of a first radio access technology and a center subcarrier location of the frequency carrier of the first radio access technology; and the second information indicates Multimedia Broadcast multicast service Single Frequency Network (MBSFN) subframe configuration information of the frequency carrier of the first radio access technology; and receiving data from the network device via the frequency carrier of the second radio access technology by avoiding, according to the first information and the second information, a time-frequency resource location in an overlapping region of the frequency carrier of the first radio access technology and the frequency carrier of the second radio access technology.

16. The device according to claim 15, wherein the time-frequency resource location comprises:

a frequency domain resource location of the time-frequency resource location indicated by the first information; and a time domain resource location of the time-frequency resource location indicated by the second information.

17. The device according to claim 16, wherein the time domain resource location of the time-frequency resource location is a time domain resource location of a non-MBSFN region in the MBSFN subframe.

18. The device according to claim 16, wherein the frequency domain resource location is of the time-frequency resource location a frequency domain resource location of the overlapping region of the frequency carrier of the first radio access technology and the frequency carrier of the second radio access technology.

19. The device according to claim 15, wherein the message further comprises third information, the third information indicating a cell-specific reference signal (CRS) configuration of the frequency carrier of the first radio access technology.

20. The device according to claim 15, wherein the message carries broadcast information or system information.

21. The device according to claim 15, wherein the processor further executes the program instructions to cause the device to perform:

determining, according to the first information and the second information, that the time-frequency resource location is not available for receiving the data from the network device via the frequency carrier of the second radio access technology.

22. A device, comprising:

a processor; and an interface circuitry, wherein the processor and the interface circuitry are coupled with each other, and wherein the processor executes program instructions to cause the device to perform:

sending a message via a frequency carrier of a second radio access technology to a terminal device, wherein:

the message comprises first information and second information;

the first information indicates a bandwidth of the frequency carrier of a first radio access technology and a center subcarrier location of the frequency carrier of the first radio access technology;

the second information indicates Multimedia Broadcast multicast service Single Frequency Network (MBSFN) subframe configuration information of the frequency carrier of the first radio access technology; and the first information and the second information indicating a time-frequency resource location in an overlapping region of the frequency carrier of the first radio access technology and the frequency carrier of the second radio access technology; and sending data to the terminal device via the frequency carrier of the second radio access technology by avoiding the time-frequency resource location.

23. The device according to claim 22, wherein the time-frequency resource location comprises:

a frequency domain resource location of the time-frequency resource location indicated by the first information; and a time domain resource location of the time-frequency resource location indicated by the second information.

24. The device according to claim 23, wherein the time domain resource location of the time-frequency resource location is a time domain resource location of a non-MBSFN region in the MBSFN subframe.

25. The device according to claim 23, wherein the frequency domain resource location of the time-frequency resource location is a frequency domain resource location of the overlapping region of the frequency carrier of the first radio access technology and the frequency carrier of the second radio access technology.

26. The device according to claim 22, wherein the message further comprises third information, the third information indicating a cell-specific reference signal (CRS) configuration of the frequency carrier of the first radio access technology.

27. The device according to claim 22, wherein the message carries broadcast information or system information.

28. A communications system, wherein the system comprises a network device and a terminal device;
wherein the network device comprises:
  a first processor; and
  a first interface circuitry, wherein the first processor and the first interface circuitry are coupled with each other, and wherein the first processor executes first program instructions to cause the network device to perform:
    sending a message via a frequency carrier of a second radio access technology to the terminal device, wherein:
      the message comprises first information and second information;
      the first information indicates a bandwidth of the frequency carrier of a first radio access technology and a center subcarrier location of the frequency carrier of the first radio access technology;
      the second information indicates Multimedia Broadcast multicast service Single Frequency Network (MBSFN) subframe configuration information of the frequency carrier of the first radio access technology; and
wherein the terminal device comprises:
  a second processor; and
  a second interface circuitry; wherein the second processor and the second interface circuitry are coupled with each other, and wherein the second processor executes second program instructions to cause the terminal device to perform:
    receiving the message via the frequency carrier of the second radio access technology from the network device; and
    receiving data from the network device via the frequency carrier of the second radio access technology by avoiding, according to the first information and the second information, a time-frequency resource location in an overlapping region of the frequency carrier of the first radio access technology and the frequency carrier of the second radio access technology.

29. The communications system according to claim 28, wherein the second processor further executes the second program instructions to cause the terminal device to perform:
  determining, according to the first information and the second information, that the time-frequency resource location is not available for receiving the data from the network device via the frequency carrier of the second radio access technology.

30. The communications system according to claim 28, wherein the time-frequency resource location comprises:
  a frequency domain resource location of the time-frequency resource location indicated by the first information; and
  a time domain resource location of the time-frequency resource location indicated by the second information.

* * * * *